United States Patent Office 3,709,989
Patented Jan. 9, 1973

3,709,989
COMPOSITION AND METHOD FOR TREATMENT OF OSSILETS AND PATHOLOGICAL CALCIFICATION IN ANIMALS
Herbert D. Schneyer, Our Lane, Stevenson, Md. 21153
No Drawing. Continuation of application Ser. No. 871,666, Nov. 10, 1969, now abandoned, which is a continuation of application Ser. No. 586,947, Oct. 17, 1966, now abandoned, which is a continuation-in-part of application Ser. No. 318,779, Oct. 22, 1963, now Patent No. 3,279,997, which is a continuation-in-part of application Ser. No. 124,305, July 10, 1961, now abandoned, which in turn is a continuation-in-part of application Ser. No. 836,174, Aug. 26, 1959, now abandoned. This application Sept. 14, 1970, Ser. No. 72,216
Int. Cl. A61k 27/00
U.S. Cl. 424—232    5 Claims The present invention relates to a composition and method for the treatment of ossilets and pathological calcification in horses and other animals.

More particularly, the invention relates to a capsule, packet or similar medication of enteric coated aspirin and enteric coated calcium lactate, or other salts, esters and derivatives of lactic acid, or lactic acid itself, or other acids related to lactic acid, or their salts, esters or other derivatives.

This application is a streamlined continuation of my copending application Ser. No. 871,666, filed Nov. 10, 1969 and now abandoned, which is a streamlined continuation of my copending application Ser. No. 586,947, filed Oct. 17, 1966, and now abandoned, which is a continuation-in-part of my application Ser. No. 318,779, filed Oct. 22, 1963, now U.S. Pat. 3,279,997, which is a continuation-in-part of my application Ser. No. 124,305, filed July 10, 1961, and now abandoned, which in turn is a continuation-in-part of my application Ser. No. 836,174, filed Aug. 26, 1959, and now abandoned.

In normal oral administration, calcium lactate and aspirin will dissolve in the stomach so as to produce merely an alkalizing or acidifying effect depending upon which is in the greater concentration. On the other hand, the present invention contemplates the use of lactic acid salt, which is calcium lactate, which is covered with a suitable enteric coating to prevent the dissolution of the calcium lactate in the stomach. The aspirin is also covered with an enteric coating to prevent its dissolution in the stomach. The enteric coated calcium lactate and aspirin are then combined in a capsule or packet, for example, along with thiamine hydrochloride and an antihistamine, such as methapyrilene hydrochloride. Thus, the thiamine hydrochloride and the methapyrilene hydrochloride are dissolved in the stomach, but the calcium lactate and aspirin pass through the stomach and do not dissolve until they reach the intestines. Therefore, it is a principal object of the present invention to provide a composition, capsule or packet of the type described above for use in the treatment of ossilets and pathological calcification in horses and other animals.

Other and further objects and advantageous features of the present invention will appear hereinafter in connection with the detailed description.

EXAMPLE 1

Calcium lactate (enteric coated) _____ grains__ 100
Thiamine HCl _____ mgms__ 500
Methapyrilene HCl _____ mgms__ 500
Aspirin (enteric coated in a gelatin capsule) grains__ 25

In order to prepare capsules of the above composition, the calcium lactate and aspirin are first given an enteric coating made according to the standard U.S.P. specification. For example, mix together calcium lactate N.F. 75 lbs. or aspirin N.F. 75 lbs. with corn starch 12½ lbs. Dampen the above mixture with 3 gallons of a solution of ethyl cellulose in alcohol. This solution is prepared by dissolving 1 lb. of ethyl cellulose in sufficient alcohol to make 1 gallon. Dry the wetted mass at 140° F. Mill the dried mass thus obtained, using a Fitzpatrick mill operated at low speed, equipped with #2 screen. Add 12 oz. talc and 6 oz. magnesium stearate. Compress the mixture into granules having a gross weight of 5 grains. (The loss of moisture from the calcium lactate compensates for the weight of excipients added.)

Transfer the granules to a coating pan and coat with cellulose acetate phthalate. Test the granules after about seven coats have been applied, using standard U.S.P. Disintegration Testing Apparatus. The granules should resist simulated gastric fluid U.S.P. for one hour, simulated intestinal fluid U.S.P. modified to pH 4.5 for an additional hour, and simulated intestinal fluid U.S.P. modified to pH 6.9 for an additional hour. They should then disintegrate when transferred to simulated intestinal fluid U.S.P. modified to pH 7.2 within one hour. If this is not the case, add additional coats of cellulose acetate phthalate and recheck the disintegration procedure. When the granules of calcium lactate or aspirin have been satisfactorily coated they should be placed into a dispenser for filling into the capsules or packets along with the remaining materials.

The thiamine hydrochloride and methapyrilene hydrochloride are also placed into measuring and dispensing units from which the exact quantity can be automatically dispensed. Conventional gelatin capsules are then fed through the automatic filling machine and the particular quantities of each of the particular materials are poured into the capsules. The capsules are then closed and packaged in convenient quantities for distribution to veterinarians.

In treating a horse or other animal with the composition of Example 1, two capsules of the formula should be given to the animal each morning until the ossilet or calcium deposit disappears. Radiographic techniques have proven very effective in checking on the disappearance of the deposit. The medication appears to function very satisfactorily with little or no side effects even after prolonged usage.

EXAMPLE 2

Calcium lactate (enteric coated) _____ grains__ 200
Thiamine HCl _____ gram__ 1
Methapyrilene HCl _____ gram__ 1
Aspirin (enteric coated in a packet) _____ grains__ 50

The calcium lactate and aspirin are each given an enteric coating, as indicated above, made according to standard U.S.P. specifications. The coated materials, thiamine hydrochloride and methapyrilene hydrochloride are then loaded into suitable measuring and dispensing units in an automatic packet filling machine. Conventional packets are fed through the machine, filled with the composition as described above, sealed and packaged in convenient quantities for distribution to veterinarians.

In employing the composition of Example 2, one packet should be given to the animal each morning until the ossilet or calcium deposit disappears. Radiographic techniques can be used to check the progress of the treatment. The administration of the medication should be continued until the ossilet or calcium deposit has cleared up. The length of treatment is dependent on the size of the deposit, but with daily administration the problem will clear up in a few weeks.

While the animal, for example a horse, is being treated, it is recommended that the animal be given only light exercise. This is particularly important if a large calcium deposit is present which would make the affected joint very sore. Care should also be taken to protect the particular joint from further injury as the animal recovers and becomes frisky.

The composition of Example 1 and Example 2 and the method of treatment has been found to be very effective in the treatment of horses and other animals. Preliminary testing of the compositions has also shown them to have considerable promise in the treatment of humans.

While there has been described what are at present considered to be preferred embodiments of the invention, it will be understood that various modifications may be made therein which are within the true spirit and scope of the invention as defined in the appended claims.

I claim:

1. A method for treating horses and other animals for ossilets and pathological calcification and preventing the formation thereof comprising dosing daily said horses and other animals, with a medication comprising, in combination about 65 parts enteric coated calcium lactate, about 16 parts enteric coated aspirin, about 5 parts thiamine hydrochloride, and about 5 parts methapyrilene hydrochloride.

2. A method for treating horses and other animals for ossilets and pathological calcification and preventing the formation thereof comprising dosing daily said, horses and other animals with two capsules, each containing 100 grains of enteric coated calcium lactate, 25 grains of enteric coated aspirin, 500 milligrams of thiamine hydrochloride, and 500 milligrams of methapyrilene hydrochloride.

3. A method for treating horses and other animals for ossilets and pathological calcification and preventing the formation thereof, comprising dosing daily said horses and other animals with one packet containing 200 grains of enteric coated calcium lactate, 50 grains of enteric coated aspirin, 1 gram of thiamine hydrochloride, and 1 gram of methapyrilene hydrochloride.

4. A method for treating horses and other animals comprising dosing said horses and other animals with a composition consisting essentially of, in combination, aspirin and calcium lactate, said combination being covered with an enteric coating, thiamine hydrochloride, and methapyrilene hydrochloride.

5. The method of claim 4 wherein the calcium lactate is in a quantity of 100 parts by weight, the aspirin is in a quantity of 25 parts by weight, the thiamine hydrochloride is in a quantity of 7.7 parts by weight and the methapyrilene is in quantity of 7.7 parts by weight.

References Cited

UNITED STATES PATENTS

| | | | |
|---|---|---|---|
| 2,768,115 | 10/1956 | Buckwalter et al. | 424—230 |
| 3,279,997 | 10/1966 | Schneyer | 424—230 |

STANLEY J. FRIEDMAN, Primary Examiner